United States Patent
Fauchet

(10) Patent No.: US 6,632,057 B1
(45) Date of Patent: Oct. 14, 2003

(54) FIXING UNIT WITH AN END IMPRINT IN A THREADED TERMINAL PORTION

(75) Inventor: Christian Roger Jacques Fauchet, Grisy-les-Platres (FR)

(73) Assignee: GFI Aerospace, Paris (FR)

( * ) Notice: Subject to any disclaimer, the term of this patent is extended or adjusted under 35 U.S.C. 154(b) by 7 days.

(21) Appl. No.: 09/874,601

(22) Filed: Jun. 5, 2001

(30) Foreign Application Priority Data

Jun. 6, 2000 (FR) .............................. 00 07213

(51) Int. Cl.$^7$ .................................. F16B 23/00
(52) U.S. Cl. ...................................... 411/403
(58) Field of Search .................. 411/402, 403, 411/410

(56) References Cited

U.S. PATENT DOCUMENTS

| | | |
|---|---|---|
| 893,536 A | 7/1908 | Kull |
| 2,083,092 A | 6/1937 | Richer |
| 2,133,409 A | 10/1938 | Webb |
| 3,584,667 A | 6/1971 | Reiland |
| 3,874,258 A | 4/1975 | Semola et al. |
| 4,073,160 A * | 2/1978 | Perret |
| 4,480,513 A | 11/1984 | McCauley et al. |
| 4,957,401 A | 9/1990 | Hatter |
| 5,019,080 A * | 5/1991 | Hemer |

FOREIGN PATENT DOCUMENTS

| | | |
|---|---|---|
| EP | 0087721 | 9/1983 |
| EP | 0273078 | 12/1986 |
| FR | 1198913 | 2/1957 |
| FR | 2383350 | 2/1978 |
| FR | 2469229 | 10/1980 |
| FR | 2584151 | 6/1985 |
| GB | 2141803 | 1/1985 |

OTHER PUBLICATIONS

Ellipses Advance Fastener Drive System, article published in Machine Design Magazine Feb. 21, 1994, p. 24.

* cited by examiner

*Primary Examiner*—Flemming Saether
(74) *Attorney, Agent, or Firm*—Pearne & Gordon LLP

(57) ABSTRACT

A fixing unit includes a threaded terminal portion, with the end face having a hollow imprint with a multilobate shape. The distance between the peripheral edge of the imprint and the external peripheral surface of the portion varies between maximum (d1) and minimum (d2) values, the ratio of which is between about 1.25 and about 1.75, and preferably substantially equal to 1.5.

9 Claims, 3 Drawing Sheets

FIXING UNIT WITH AN END IMPRINT IN A THREADED TERMINAL PORTION

TECHNICAL FIELD

The invention relates to a fixing unit comprising a threaded terminal portion with one face having a hollow imprint able to receive a maneuvering tool of a complementary shape.

A fixing unit of this type is intended to be associated with a nut, in order to perform the assembly of at least two parts from one side of said assembly.

The invention finds a preferential application in the aircraft industry. However, it may be used in any other industrial field, notably when access to one of the sides of the parts to be assembled is difficult or impossible.

STATE OF THE ART

As notably illustrated in documents FR-A-2 383 350, U.S. Pat. No. 2,083,092 and U.S. Pat. No. 3,584,667, fixing units with a hollow head are known, such as screws, the head of which includes a hollow imprint, with a multilobate shape, provided for cooperating with a driving tool with a matching shape. The multilobate shape of the hollow imprint enables a larger tightening torque to be achieved than the one which would be achieved by using a polygonal imprint with equivalent characteristics. Indeed, the unfolded length of a polygonal contour with straight sides is smaller than the unfolded length of a contour with curved sides.

In these hollow head screws of the prior art, selection of the external diameter of the screw head is generally free and no stress is applied on said head after forming the imprint. Therefore, there is no risk of cracking the head of the screw around the imprint.

Moreover, as it is notably shown in document GB-A-893, 356, it is known that the tightening torque obtained with a hollow head fixing unit increases with the engagement depth of the tool, i.e. with the depth of the imprint provided in the head of the fixing unit. This document also shows the increase in the tightening torque obtained when passing from a hexagonal imprint to an equivalent imprint with curved sides.

The use of fixing screws with one of its faces having a multilobe-shaped imprint is provided in U.S. Pat. No. 3,874, 258.

Whether it be a screw or a nut, it may be seen that in all these known fixing units, the imprint for cooperating with the tool is always provided in a portion (screw head, etc.) with a bulging external shape. The reinforcement thereby obtained notably enables the tool to exert a large tightening torque without causing deformation of the material.

Fixing units are also known which include a threaded terminal portion with the end face including an imprint for receiving a driving tool. Such a headless unit, called a "tubular screw" or "head-less screw", is generally used for performing the assembly of several parts. As notably illustrated in documents U.S. Pat. No. 2,133,409, U.S. Pat. No. 2,532,815 and U.S. Pat. No. 4,480,513, the imprint used is then essentially of a hexagonal shape.

As illustrated by documents U.S. Pat. No. 4,957,401 and FR-A-1198 913, fixing units provided with a head without an imprint but having a threaded terminal portion with a hexagonal imprint are also known. Such units are for assembling parts accessible from only one side.

It is known that the fixing units including an imprint in their threaded portion have lesser mechanical strength because of the presence of this imprint. This lesser strength is notably apparent when the thread is formed by roll bending and rolling the material at the surface of the blank, according to the technique described in document FR-A-2 469 229. This technique consists of mounting the blank between two rolls, with threads, in order to form the thread by pushing back the material, notably by exerting radial stresses on the rotating blank.

As illustrated in FIG. 1 of the appended drawings, when this shaping technique for thread 2 is applied on a blank 1 including an imprint 3 in the portion intended for forming the thread, clinks 4 may appear in the angles of the imprint, whether the latter is of a hexagonal or other shape. These clinks 4 originate from the uncontrolled variation of the stiffness of the cross-section on which rolling stresses are applied.

In document FR-A-2 584 151, a solution to this problem is provided by making a multilobe-shaped imprint provided with an odd number of lobes, preferably equal to seven. More specifically, the imprint formed in the threaded end of the fixing unit includes a peripheral edge in the shape of a continuous curved line including an odd number of identical lobes, regularly distributed on this edge.

As explained in this document, the particular shape of the imprint provides the advantage of allowing the latter to be made by plastic deformation of the metal, simultaneously with the forging of the blank, before the thread is formed by roll bending and rolling of the material at the surface of the rough specimen, by limiting the risks of cracking in the annular area located around the peripheral edge of the imprint. This advantage may particularly be appreciated in the case of materials which are difficult to deform plastically, for which risks of clink formation are particularly high. It is thereby possible, with this multilobate imprint shape to increase the torque applied on the fixing unit in order to hold it and contribute to the blocking of the nut.

However, tests conducted by the applicant have shown that relatively comparable results may be obtained with a fixing unit, the imprint of which having an even number of lobes. These tests have also shown that the use of an multilobe-shaped imprint, having an odd or even number of lobes, was not sufficient, per se, for suppressing any risks of occurrence of cracks during the roll bending and rolling operation subsequently to the formation of the imprint. Therefore, the problem consisting of surely eliminating the cracks upon making the thread is not solved in a totally satisfactory way by the teachings of document FR-A-2 584 151.

DESCRIPTION OF THE INVENTION

The object of the invention is specifically a threaded fixing unit with a multilobe-shaped imprint, the original design of which is able to surely prevent crack formation in the metal, when the thread is made by rolling after obtaining the imprint by plastic deformation of the metal, during the forging of the blank.

According to the invention, this result is obtained by means of a fixing unit comprising a threaded terminal portion with an end face having a hollow imprint able to receive a maneuvering tool of said unit, said imprint including a peripheral edge in the shape of a continuous curved line including at least three lobes, distributed on said edge, characterized in that the distance between the peripheral edge of the imprint and an external peripheral surface of the threaded terminal portion varies between a maximum distance and a minimum distance, whereby the ratio between said maximum and minimum distances is between about 1.25 and about 1.75.

Tests performed by the applicant have actually shown that the ratio between the aforementioned maximum and minimum distances is an essential feature enabling the definition of the lobes of the imprint to be optimized in order to allow the subsequent formation of the thread without any risks of occurrence of clinks or cracks. Thus, the applicant established that only fixing units in which the imprint is made by observing a ratio between the aforementioned maximum and minimum distances between about 1.25 and about 1.75, were able to prevent formation of clinks or cracks.

Although it is possible to make a fixing unit with the imprint including lobes of different shapes, the lobes are preferably all identical and regularly distributed.

Advantageously, each of the lobes comprises two side faces forming between them an angle, the apex of which is substantially located on the external peripheral surface of the threaded terminal portion.

This angle is preferably between about 23° and about 37°. This feature, combined with that relating to the ratio between the aforementioned maximum and minimum distances, increases the stiffness of the whole, which enables the crack strength to be increased during the rolling operation. Actually, an angle greater than 37° promotes occurrence of clinks under the rolling stresses, as the angle then tends to "open and close", alternately. Conversely, an angle less than 23° tends to form "natural tips" of overstress, which is also favorable to the formation of clinks.

Preferably, the peripheral edge of the imprint comprises four to ten lobes.

According to a first preferred embodiment of the invention, the peripheral edge of the imprint comprises five lobes and the aforementioned angle is between 26° and 32°.

According to a second preferred embodiment of the invention, the peripheral edge of the imprint comprises seven lobes and the aforementioned angle is between 25° and 27°.

In the preferred embodiments of the invention, the ratio between the maximum and minimum distances is substantially equal to 1.5.

Although may types of metal may be used, the invention is particularly suitable for the case when the fixing unit is made of a titanium alloy or of a metal material which is difficult to deform plastically.

SHORT DESCRIPTION OF THE DRAWINGS

Two preferred embodiments of the invention will now be described as non-limiting examples, with reference to the appended drawings, wherein FIG. 1 already described, is an end view of a fixing unit with a hexagonal imprint of the prior art;

Figure 3:
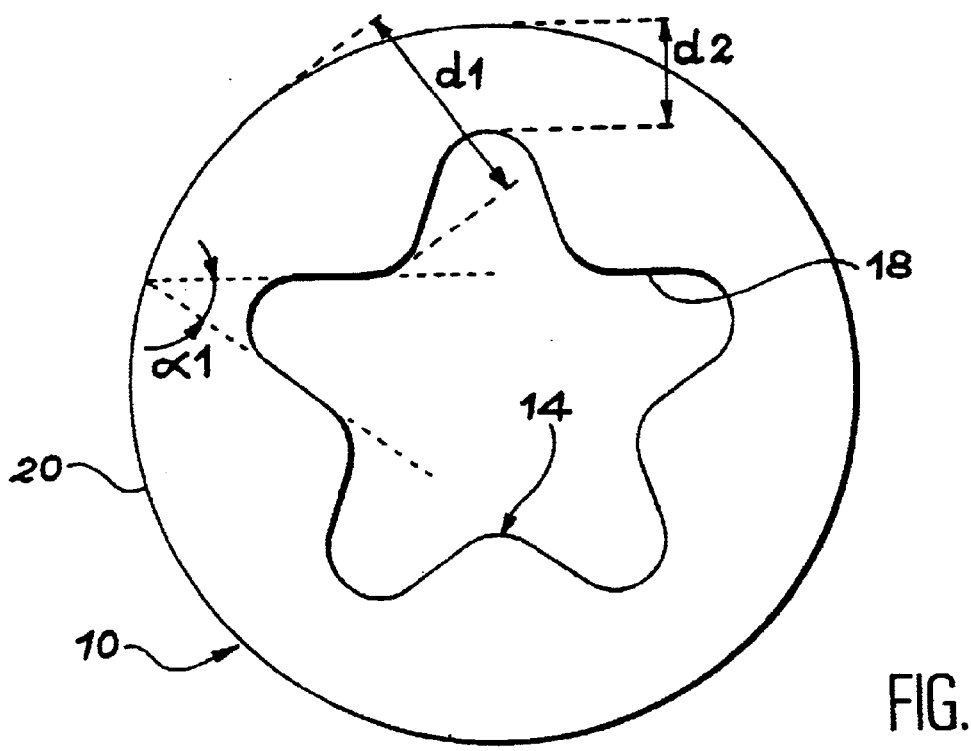
FIG. 3 is an end view of a first embodiment of the fixing unit, wherein the imprint comprises five lobes.
Figure 4:
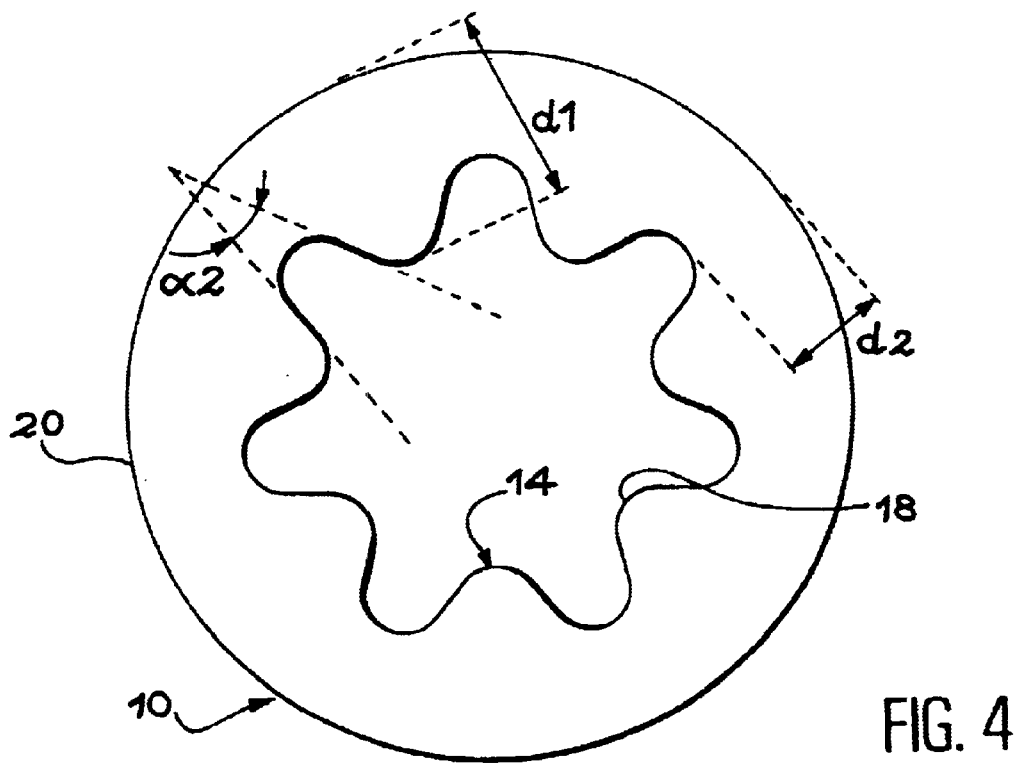
FIG. 4 is an end view comparable with FIG. 3, illustrating a second embodiment of the invention, wherein the imprint comprises seven lobes.
Figure 5:
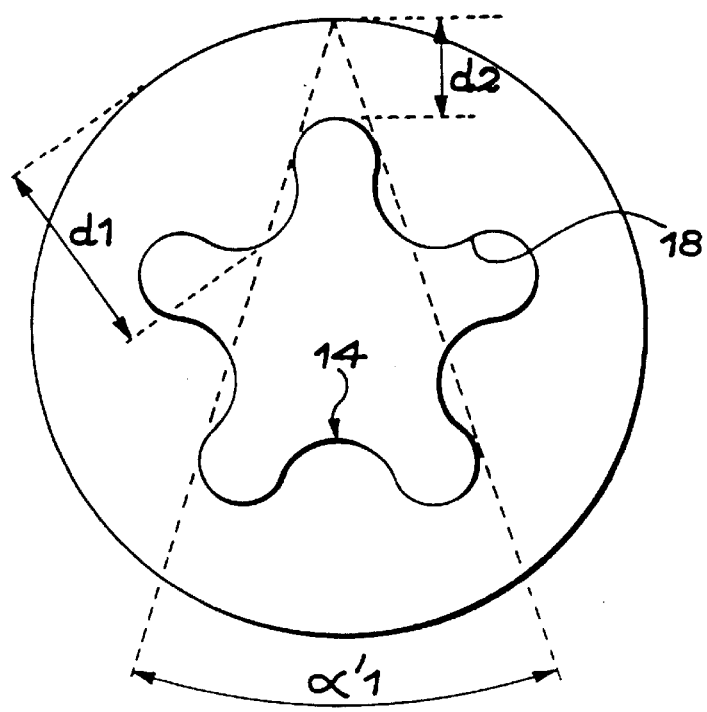
Figure 6:
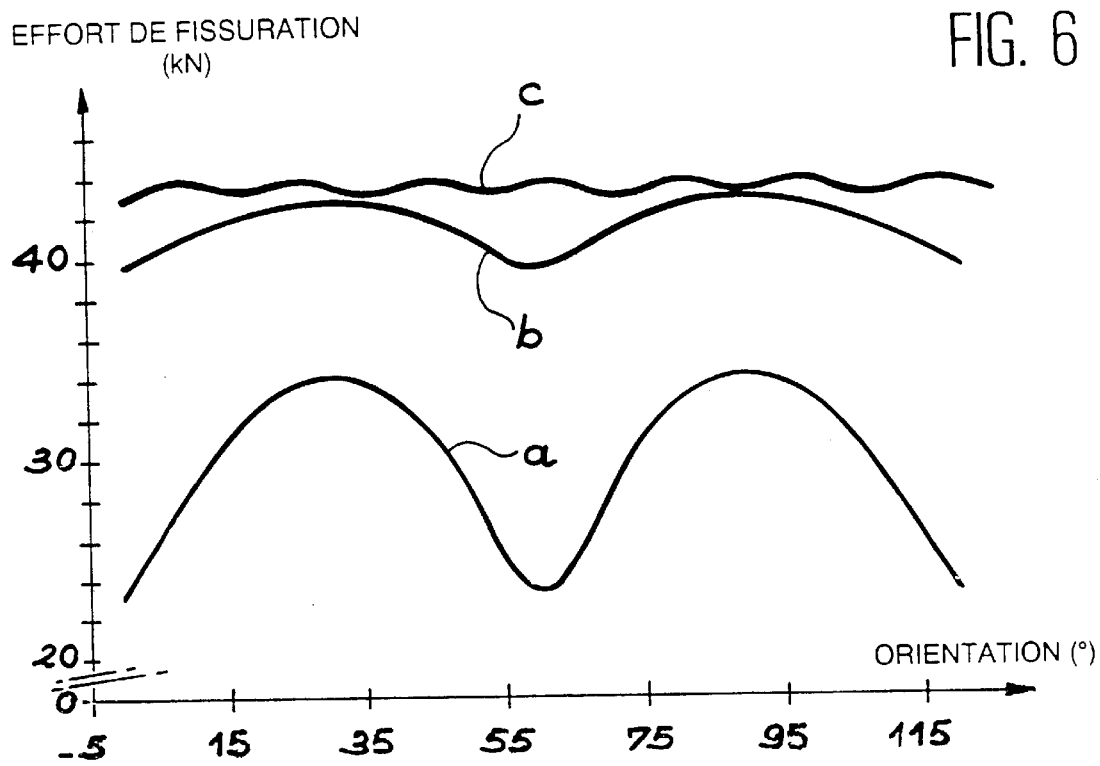
Figure 1:
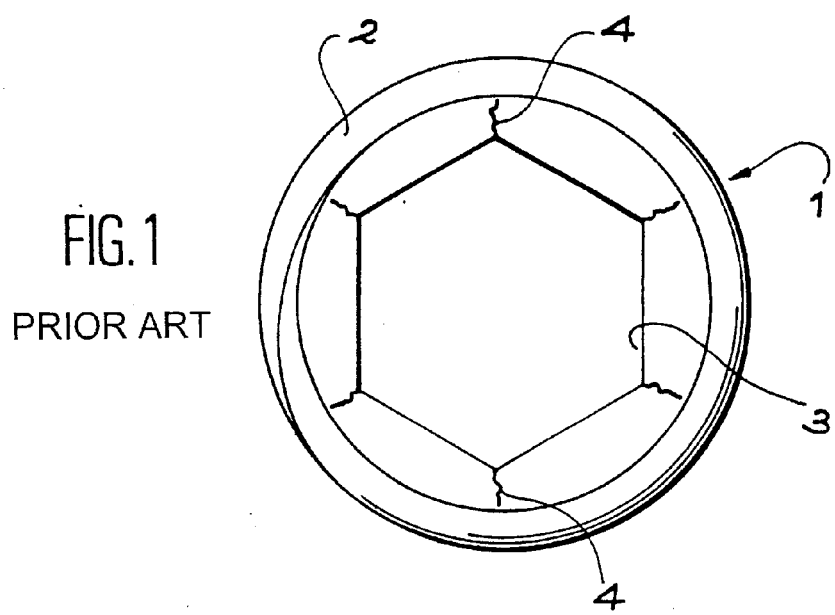
Figure 2:
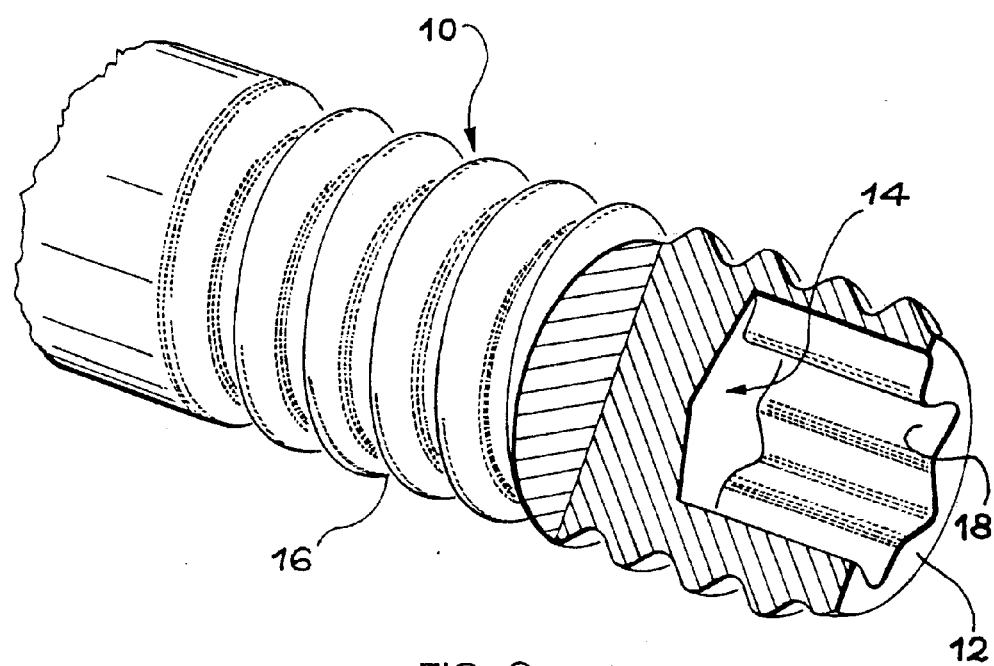
Figure 5:
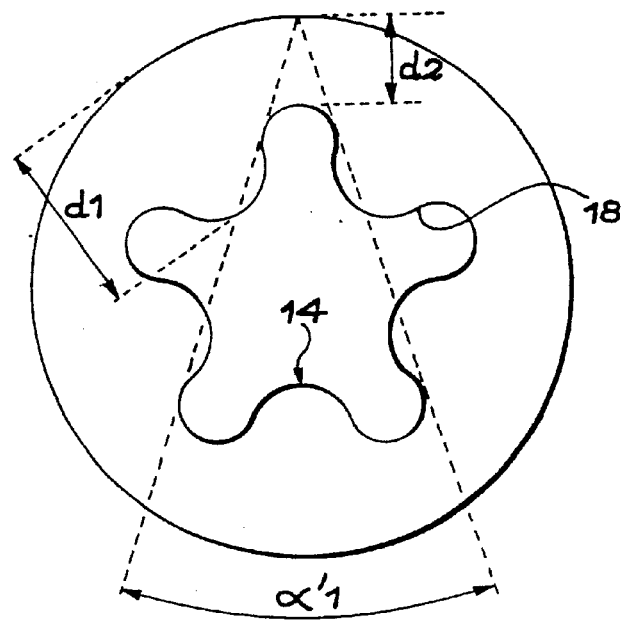
Figure 6:
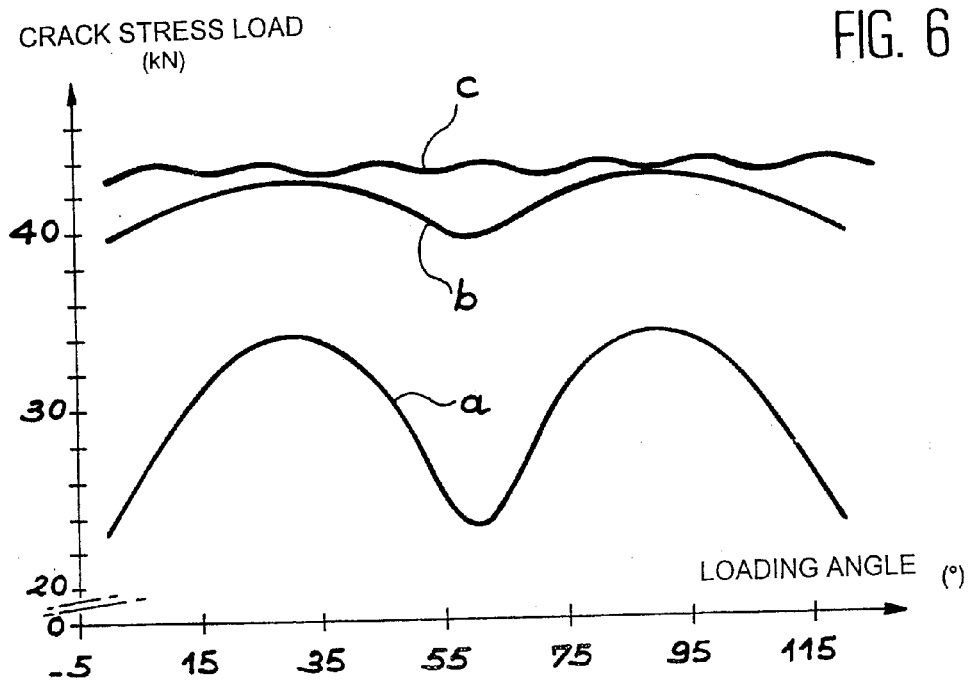

FIG. 5 is an end view comparable with FIGS. 3 and 4, illustrating an alternative of the first embodiment relating to an imprint with five lobes; and FIG. 6 shows the variation of the crack stress load (kN) versus the loading angle (degrees) in the case of a conventional hexagonal imprint (curve a), in the case of a six lobe imprint according to the invention (curve b) and in the case of the five lobe imprint according to the invention, illustrated in FIG. 3 (curve c).

DETAILED DESCRIPTION OF TWO PREFERRED EMBODIMENTS OF THE INVENTION

Figure 2:
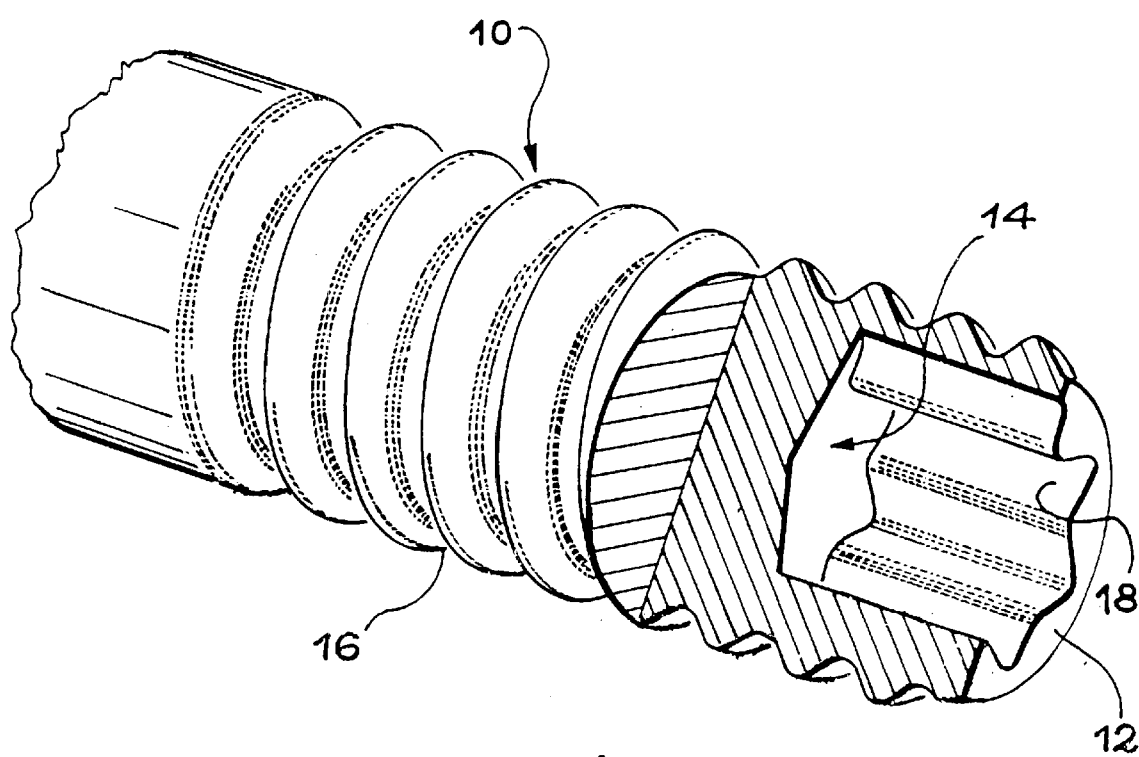
FIG. 2 is a partially sectional perspective view, which illustrates a portion of a fixing unit made according to the invention.

In FIG. 2, a threaded terminal portion 10 of a fixing unit made according to the invention is illustrated. This fixing unit may be made in any metal. In the preferred embodiments of the invention, a high yield strength and low plastic deformation metal is used, such as a titanium alloy.

The fixing unit according to the invention is for performing the assembly of at least two parts (not shown), from one side of this assembly. For this purpose, the fixing unit rests on the stack of parts through a head of any shape (not shown) located on the other side of the assembly. The fixing unit crosses aligned holes formed for this purpose in each of the parts. The threaded terminal portion 10 protrudes on the accessible side of the assembly, so as to be able to cooperate with a nut (not shown) for assembling the different parts.

Alternatively, the fixing unit according to the invention, may also be a unit of the "tubular screw" type, without a head.

The fixing unit comprising the threaded terminal portion 10 is a bulk part made by forging, then rolling.

More specifically, first of all, a rough specimen is made by forging, generally appearing as a cylindrical rod provided with a head. On its end face forming the end face 12 of the threaded terminal portion 10 of the finished part, this rough specimen of a part comprises a hollow imprint 14, also obtained during the forging. A threading 16 may be formed on the external peripheral surface of the blank by a subsequent rolling operation.

Reference number 20 refers to the external peripheral surface of the threaded terminal portion 10. More specifically, the expression "external peripheral surface", in all the text, corresponds to the diameter on the flanks of the threading, i.e. to the diameter of the threaded portion 10, at half the height of the threads. The external peripheral surface 20 also corresponds to the external diameter of the rough specimen before rolling.

The hollow imprint 14, includes a peripheral edge 18 which forms a continuous curved line, i.e. with no discontinuity, when the fixing unit is seen from the end.

More specifically, the continuous curved line formed by the peripheral edge 18 includes at least three lobes distributed on this edge. All the lobes of the imprint 14 are preferably the same and regularly distributed on the peripheral edge 18. However, they may also assume different shapes, a same imprint may for example be formed of large lobes and small lobes alternately. They may also be positioned at irregular intervals along edge 18.

Advantageously, the peripheral edge 18 of the imprint 14 comprises at least four lobes and at most ten lobes.

According to a first preferred embodiment of the invention, illustrated in FIG. 3, and according to an alternative of this first embodiment illustrated in FIG. 5, the peripheral edge 18 of imprint 14 includes five identical lobes, regularly distributed on edge 18.

In a second preferred embodiment of the invention, illustrated in FIG. 4, the peripheral edge 18 of imprint 14 comprises seven identical lobes, regularly distributed on edge 18.

As illustrated more particularly in FIGS. 3, 4 and 5, the multilobate shape of the imprint 14 is such that the distance between the peripheral edge 18 of this imprint and the external peripheral surface 20 of the threaded terminal portion 10 varies between a maximum distance d1 and a minimum distance d2. According to an essential feature of the invention, the ratio between the maximum distance d1 and the minimum distance d2 is between about 1.25 and about 1.75. In the preferred embodiments of the invention illustrated in FIGS. 3, 4 and 5, this ratio preferably is substantially equal to 1.5.

The shape of the peripheral edge 18 of imprint 14 is also characterized by the angle formed between the two side faces of a same lobe. In the preferred embodiment of the invention, this angle is between about 23° and about 37°.

In the embodiment of FIG. 3 and its alternative in FIG. 4, each of the lobes formed by the peripheral edge 18 of imprint 14 is delimited by an arc of circle forming the bottom of the lobe and by two plane side faces tangent to this arc of circle. The adjacent lobes are connected through arcs of circles tangent to the plane side faces of said lobes.

In the first illustrated embodiment in FIG. 3, the angle $\alpha 1$ formed by both side faces of each of the five lobes is substantially equal to 30°. In concrete terms, this means that this angle $\alpha 1$ may vary between 26° and 32°.

In a comparable way, in the second preferred embodiment of the invention illustrated in FIG. 4, the angle $\alpha 2$ formed between both side faces of each of the seven lobes is substantially equal to 26°. In concrete terms this means that this angel $\alpha 2$ may vary between 25° and 27°.

The alternative embodiment illustrated in FIG. 5 differs from the embodiment of FIG. 3 by the fact that each lobe is sectionally defined by the joining of an external arc of circle with two internal arcs of circle of a larger radius of curvature. In this case, the side faces of the lobe, between which is measured the angle $\alpha'1$, do not pass through the inflection points of the arcs of circle but are both tangent to both sides of the considered lobe and to the opposite side of the two diametrically opposite lobes to the latter (this phenomenon is intentionally exaggerated in FIG. 5, to facilitate understanding).

In the different embodiments of the invention, the apex of angles $\alpha 1$, $\alpha 2$, or $\alpha'1$ is substantially located on the external peripheral surface 20 of the threaded terminal portion 10. The term "substantially" means that the apex of the angle may be placed on this surface (FIGS. 3 and 5) or near the latter (FIG. 4).

The particular shape of the imprint 14 according to the invention and particularly the ratio being maintained between the maximum d1 and minimum d2 distances in a range between about 1.25 and about 1.75, enables the crack strength to be maintained, while making the thread 16 by rolling, at an optimized value, substantially constant over the entire periphery of the part. In other words, the sectionally delimited surface between the external peripheral surface 20 and the peripheral edge 18 of imprint 14 are thus optimized.

This feature is illustrated in FIG. 6, which illustrates the variation of the crack stress load (kN) under the effect of a loading of the type produced by a rolling stress (i.e. mainly acting along a diameter) versus the loading angle (degrees). More specifically, curves a, b, and c illustrate this variation in the case of a hexagonal imprint, in the case of a six lobe imprint according to the invention and in the case of a five lobe imprint according to the invention, respectively, as illustrated in FIG. 3.

As illustrated as an example in curve a, a conventional hexagonal imprint starts to crack at low stress loads (about 23 kN). This explains why it is not possible to form a thread by rolling after having made such an imprint in a material which is difficult to deform plastically, such as high strength steel, titanium alloy, etc.

In the case of a multilobe-shaped imprint with six lobes (curve b) wherein the ratio of distances d1/d2 complies with the invention, the amplitude of the critical stress variation is significantly reduced with respect to that of the conventional hexagonal imprint of curve a. Further, the low points are located much higher (around 39 kN).

Curve c shows the optimized case of a multilobate imprint with five lobes, according to the invention as described with reference to FIG. 3. The profile of the curve is virtually flat (amplitude of the variations less than 1 kN) and the stress level is 10% greater than that of the six lobe imprint and 80 to 90% greater than the low points of curve a (hexagonal imprint). Overstresses may virtually be suppressed and fatigue toughness of the screw may notably be improved in service, because the material does not have a weak point after forming the thread.

A fixing unit provided with such an imprint that the ratio between the maximum distance and the minimum distance is greater than about 1.75 would on the contrary, show a substantially more marked saw-tooth variation, expressed by a risk of cracking upon making the thread. Moreover, a ratio of distances less than about 1.25 would be expressed by a deformation of the imprint under the effect of the cooperation with the maneuvering tool.

As a conclusion, the invention therefore provides a definition of an optimized multilobate imprint, which allows a thread to be formed on the contour of the rough specimen, without causing the occurrence of clinks or permanent deformation.

What is claimed is:

1. A fixing unit comprising a threaded terminal portion with an end face having a hollow imprint able to receive a maneuvering tool of said unit, said imprint including a peripheral edge in the shape of a continuous curved line including at least three lobes, distributed on said edge, wherein the distance between the peripheral edge of the imprint and an external peripheral surface of the threaded terminal portion varies between a maximum distance and a minimum distance, whereby the ratio between said maximum and minimum distances is between about 1.25 and 1.75, wherein each lobe comprises two side faces forming between them an angle, the apex of which is substantially located on the external peripheral surface of the threaded terminal portion.

2. The fixing unit according to claim 1, wherein said angle is between about 23° and about 37°.

3. The fixing unit according to claim 2, wherein the peripheral edge of the imprint comprises four to ten lobes.

4. The fixing unit according to claim 3, wherein the peripheral edge of the imprint comprises five lobes and said angle is between 26° and 32°.

5. The fixing unit according to claim 3, wherein the peripheral edge of the imprint comprises seven lobes and said angle is between 25° and 27°.

6. The fixing unit according to claim 1, wherein all the lobes are identical and regularly distributed.

7. The fixing unit according to claim 1, wherein the ratio between the maximum and the minimum distances is substantially equal to 1.5.

8. The fixing unit according to claim 1, wherein said unit is comprised of a titanium alloy.

9. A fixing unit comprising a threaded terminal portion with an end face having a hollow imprint able to receive a maneuvering tool of said unit, said imprint including a peripheral edge in the shape of a continuous curved line including at least three lobes, distributed on said edge, wherein the distance between the peripheral edge of the imprint and an external peripheral surface of the threaded terminal portion varies between a maximum distance and a minimum distance, whereby the ratio between said maximum and minimum distances is between about 1.25 and about 1.75, each lobe comprising two side faces forming between them an angle, the apex of which is substantially located on an external peripheral surface of the threaded terminal portion.

* * * * *

UNITED STATES PATENT AND TRADEMARK OFFICE
CERTIFICATE OF CORRECTION

PATENT NO.     : 6,632,057 B1
DATED          : October 14, 2003
INVENTOR(S)    : Christian Roger Jacques Fauchet It is certified that error appears in the above-identified patent and that said Letters Patent is hereby corrected as shown below:

<u>Title page,</u>
Item [56], References Cited, U.S. PATENT DOCUMENTS, please delete "893,536 A 7/1908 Kull"
FOREIGN PATENT DOCUMENTS, insert therefore -- GB 893,536 4/1962 --

Figure 1:
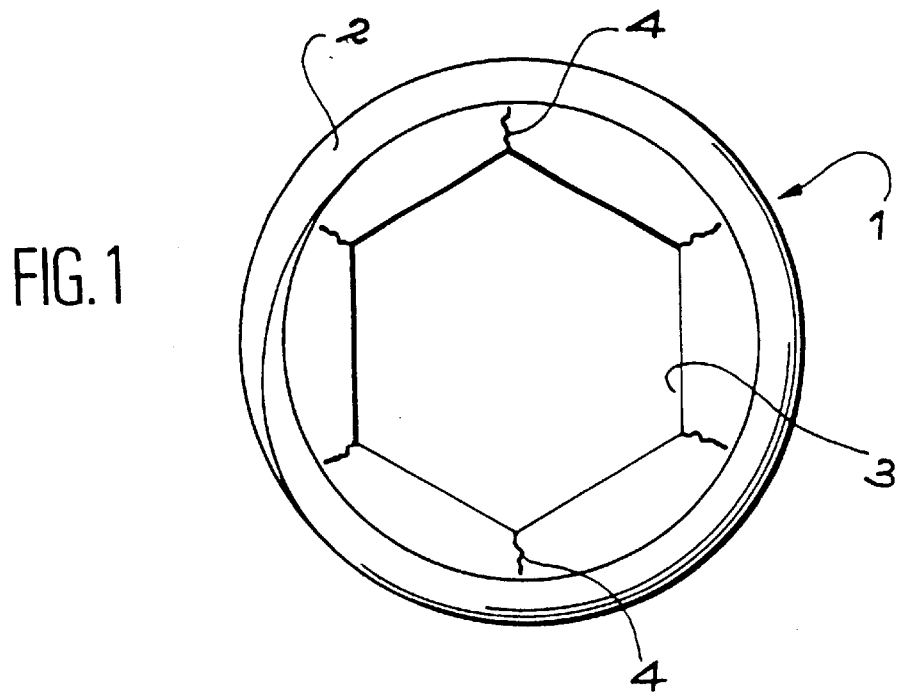

<u>Drawings,</u>
Please delete sheet 1 of drawings containing Figs. 1 and 2, and insert therefore new sheet 1.
Please delete sheet 3 of drawings containing Figs. 5 and 6, and insert therefor new sheet3.

Signed and Sealed this

Twenty-fourth Day of August, 2004

JON W. DUDAS
*Director of the United States Patent and Trademark Office*